(12) United States Patent
Hasbun

(10) Patent No.: US 7,698,739 B2
(45) Date of Patent: Apr. 13, 2010

(54) UPDATING CODE WITH VALIDATION

(75) Inventor: Robert Hasbun, Placerville, CA (US)

(73) Assignee: Marvell International Ltd., Hamilton (BM)

( * ) Notice: Subject to any disclaimer, the term of this patent is extended or adjusted under 35 U.S.C. 154(b) by 1504 days.

(21) Appl. No.: 10/812,564

(22) Filed: Mar. 30, 2004

(65) Prior Publication Data

US 2005/0221810 A1     Oct. 6, 2005

(51) Int. Cl.
G06F 11/00 (2006.01)
G06F 12/14 (2006.01)
G06F 12/16 (2006.01)
G06B 23/00 (2006.01)

(52) U.S. Cl. ........................................ 726/22; 380/248

(58) Field of Classification Search ................. 710/109; 709/246; 370/338; 713/176; 380/270, 248; 726/22

See application file for complete search history.

(56) References Cited

U.S. PATENT DOCUMENTS

| | | | | |
|---|---|---|---|---|
| 5,922,061 A * | 7/1999 | Robinson | ................... | 710/109 |
| 6,895,253 B1 * | 5/2005 | Carloni et al. | .............. | 455/506 |
| 6,925,562 B2 * | 8/2005 | Gulcu et al. | ................. | 713/172 |
| 7,028,149 B2 * | 4/2006 | Grawrock et al. | ........... | 711/156 |
| 7,047,343 B2 * | 5/2006 | Shaw | ......................... | 710/305 |
| 7,062,622 B2 * | 6/2006 | Peinado | ..................... | 711/163 |
| 7,137,004 B2 * | 11/2006 | England et al. | ............. | 713/176 |
| 7,145,481 B2 * | 12/2006 | Cooper | ........................ | 341/26 |
| 7,178,041 B2 * | 2/2007 | Asokan et al. | ............. | 713/194 |
| 7,245,725 B1 * | 7/2007 | Beard | ......................... | 380/270 |
| 7,450,524 B2 * | 11/2008 | Hennessey et al. | .......... | 370/254 |
| 2003/0105879 A1 * | 6/2003 | Olson | ......................... | 709/246 |
| 2003/0147369 A1 * | 8/2003 | Singh et al. | ................. | 370/338 |
| 2004/0268143 A1 * | 12/2004 | Poisner | ...................... | 713/200 |

* cited by examiner

*Primary Examiner*—Kambiz Zand
*Assistant Examiner*—Monjour Rahim

(57) ABSTRACT

In one embodiment, the present invention includes a method to initiate updating of a second portion of a system if a value indicates that the system is in a trusted state. In such an embodiment, a first portion of the system may validate updated code before the second portion of the system is updated. In one such embodiment, the first portion may be an applications portion and the second portion may be a communications portion of a wireless device.

35 Claims, 3 Drawing Sheets

UPDATING CODE WITH VALIDATION

BACKGROUND

Typically updates for wireless devices, such as cellular telephone handsets, are done in a factory or at an authorized service center because of the risk of downloading corrupted or malicious code, which could impact handset functionality and network provider revenue. As handsets move from a closed architecture environment to rich media and services, a method to enable new features, remedy bugs, update protocol code, and the like, in wireless devices is desirable.

Typically, such updates occur by receiving data packets at the communications portion of the device and providing the packets to an applications portion of the device for manipulation into a file, and then sending the file back to the communications portion. Because remote updates not done in a factory or service center are exposed to viruses, hacking and other malicious actions, methods to verify that a file came from a trusted source and that the file is not corrupted exist for the applications portion. However, updating the communications portion of the device is problematic. The communications subsystem does not have the processing power, code or data space to download and verify a full update in an autonomous fashion. Further, it would not be practical for the communication subsystem to include flash management, file-system support, cryptographic and other security capabilities, as multiple such code portions would exist in the wireless device, potentially causing conflicts, compatibility, resource, and implementation issues. Thus a need exists for a communications subsystem to verify that an update is trusted autonomously from the applications subsystem. Further, to enable updates, upgrade a device, remedy bugs, or to upgrade a communications portion of a device outside of the service center or factory (e.g., over-the-air (OTA)), a non-spoofable method of verifying the trust state of the applications subsystem is required.

DETAILED DESCRIPTION

Updates of code, data, and other information, and secure operations intended for a communications portion of a wireless device may be performed in accordance with various embodiments of the present invention. As used herein, the term "information" may refer to both data and/or instructions. While the device may vary, in certain embodiments, a wireless device may be a cellular telephone (e.g., of a 2.5 generation (G) or later variety), a personal digital assistant (PDA), or a notebook computer, for example.

Such updates can vary in different embodiments. In certain embodiments, the updates may relate to communications or software updates to remedy bugs. Alternately, updates may include downloading of any other desired digital content into the wireless device. While such content may take various forms, in certain embodiments the digital content may be secure content, such as rights management data or keys to manage video or audio file access and the like. Further, in certain embodiments, digital content may be applications desired by a user of the wireless device. The initiation of downloading updates to the wireless device may vary: for example, updates to code may be initiated by a service provider, while downloading of multimedia digital content may be initiated by the user.

Figure 1:
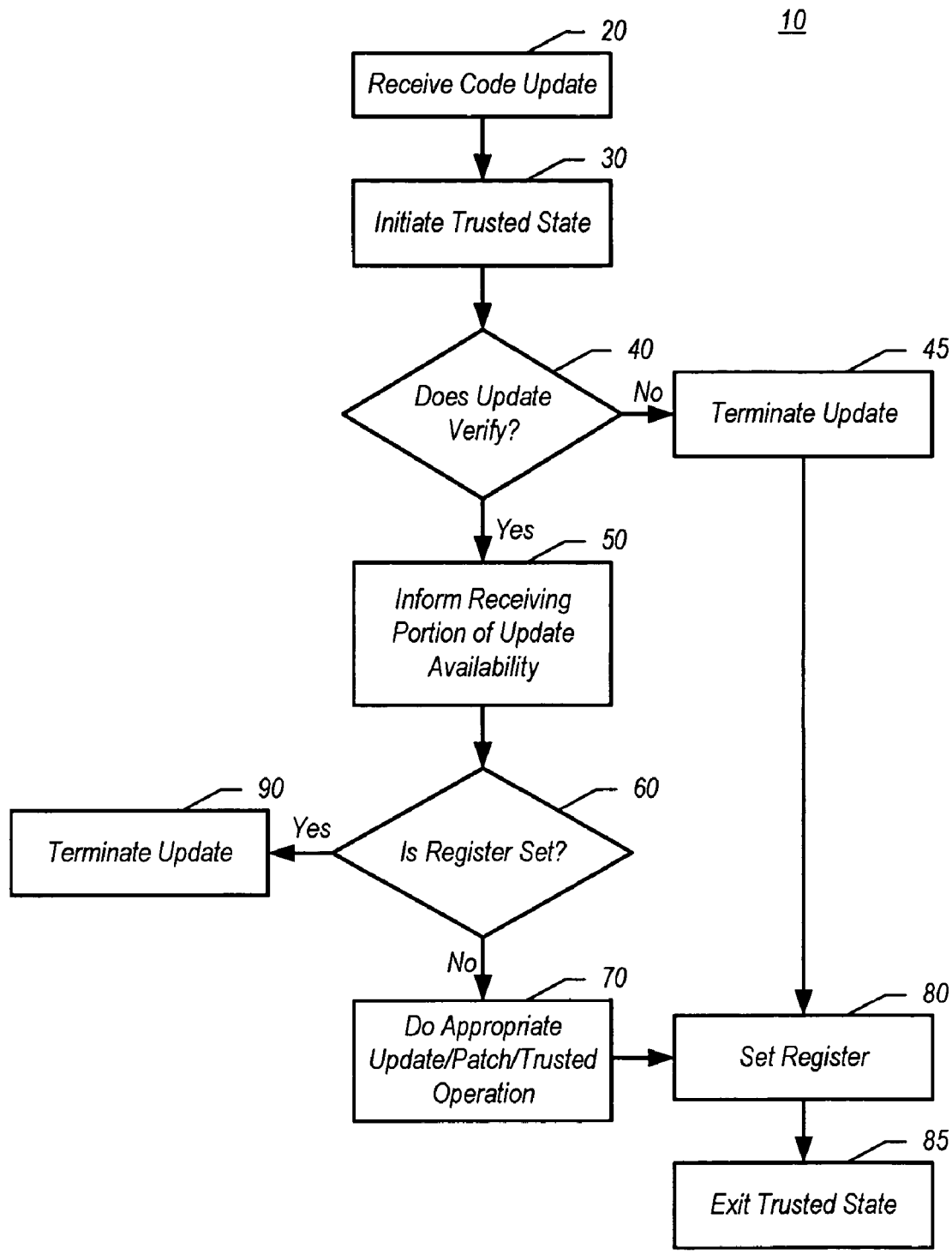
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may begin by receiving a code update (block 20). While shown in the embodiment of FIG. 1 as receiving a code update, it is to be understood that in different embodiments, various information types may be received.

In certain embodiments, upon receipt of such code, an update manager or loader (which may be in an applications subsystem) may verify (by public/private key and/or other robust methods) the credibility of the external update code, the integrity of the code to be updated, as well as ensuring that the code was sent by a trusted source, and meant for download to the device. For example, in certain embodiments, data packets received via an air-interface protocol such as tunneled transmission control protocol/Internet protocol (TCP/IP) packets, may be received by a communications processor and forwarded directly to the applications processor for decryption and resolving into a file.

After such data packets are resolved into a file and stored in memory (e.g., memory associated with the applications processor), the file may be validated using the same robust cryptographic code the applications processor would use to verify any other file (e.g., triple data encryption standard (3DES) or advanced encryption standard (AES) for encryption, Secure Hash Algorithm (SHA) for integrity checking, and Rivest Shamir Adelman (RSA) for signature verification, or the like) to ensure that the file has not been permuted and that the code is authenticated. In certain embodiments, various security processes, such as performing signature verification, hashing and other operations may occur, as well known to those of skill in the art. Upon validation of the code, it may be stored in a predetermined location in memory in which code update portions are stored prior to the update process. In one embodiment, the memory may be a nonvolatile memory.

After a successful download, the applications subsystem may initiate itself into a trusted state (block 30). For example, the applications subsystem may cause itself to be reset into a trusted state. In various embodiments, a trusted state may perform trusted processes from a trusted code base, which may be a minimal code base. However, normal application programs of the device, such as communications and data processing, may not be performed in the trusted state, but only after the trusted state is exited.

Such a trusted state may occur immediately or may be deferred until a later time. For example, the processor may vector to a fixed read-only memory (ROM) location. In certain embodiments, initiation into a trusted state may be performed by causing the wireless device to restart through a power-on self test (POST) operation. For example, such a POST routine may be performed upon booting up the wireless device (i.e., upon a hard reset). However, in other embodiments, a trusted state may be initiated without a power on reset of the device.

It is to be noted that during the reset and initiation of a trusted state, a hardware asset of the wireless device may be implemented to provide a non-spoofable indicator of the state of the applications subsystem (i.e., that it is in a trusted state). For example, in one embodiment, a one-way register (as will be discussed further below with regard to FIG. 2) may be cleared upon reset or entering of a trusted state. In other embodiments, another hardware asset, such as a voltage level generator, or private data signal or strobe may be used to provide such an indication of a trusted state.

In certain embodiments, upon reset, the applications processor may look for an updated code portion, either at a particular location or by a known indicator. Then the applications subsystem may determine whether the code update is verified (diamond 40). For example, in one embodiment, the applications processor may verify the cryptographic validity of the image as described above.

While discussed herein as including an applications subsystem and a communications subsystem, it is to be understood that in other embodiments, methods may be used in connection with a system having a transmitting subsystem (i.e., a sender of a code update or the like) and a receiving subsystem (i.e., a receiver of such an update or the like).

If the code update is not verified (e.g., the cryptographic or other verification method fails), the update may be terminated (block 45). Furthermore, the hardware asset, e.g., the one-way register, may be set by the applications subsystem to provide an indication that the applications subsystem is about to leave a trusted state (block 80). While shown in the embodiment of FIG. 1 as setting the register, in other embodiments, the method may be performed by resetting the register to indicate that the trusted environment is about to be exited. Of course in other embodiments, a different hardware asset may be manipulated to indicate that the system has left its trusted state.

Finally, the trusted state may be exited (block 85). At such time, remediation for the failure to update may be undertaken, such as a virus scan, verification of the platform software, or the like. If appropriate, normal system operations may commence, and one or more desired application programs may be executed. Because of the failure of verification of the update, no update is applied to the communications subsystem.

If instead the code update is verified at diamond 40, a receiving portion of the system may be informed of the availability of the update (block 50). In this instance, note that the one-way register is not set and accordingly remains in its initial (i.e., logic 0) state. The indication of update availability may be sent from the applications subsystem to the communications subsystem on a desired channel. For example, a data packet including such a message may be sent on a scalable link between the two subsystems.

When the communications subsystem receives the indication, it may check the one-way register to determine whether it is set (diamond 60). If the register is not set, this indicates that the applications subsystem is in a trusted state and that the indication of a code update and the content of the code update itself may be trusted.

Accordingly, the desired update may be downloaded to the communications subsystem (block 70). In other embodiments, rather than a code update, a software patch or new code download, or a trusted operation may be performed as instructed or delivered by the applications subsystem. In yet other embodiments, other types of content for a communications subsystem may be sent in accordance with such a method. Such content may include a validated driver or other updated software, a configuration file, or the like.

In various embodiments, the communications subsystem may copy the update code into its memory in any one of a number of well-known manners, and may use the code to program and run the communications subsystem after its receipt and storage.

When the update code or other action is successfully downloaded or communicated to the communications subsystem, the one-way register may be set as discussed above (block 80), and the applications subsystem trusted state may be exited (block 85), also discussed above.

If instead the communications subsystem determines at diamond 60 that the register is set, the update is terminated (block 90). Of course, as discussed above in other embodiments, a different hardware asset may be used to indicate the trust state of the application subsystem.

Furthermore, in certain embodiments in addition to terminating the update, the communications subsystem may perform a remediation event or send an indication to the applications subsystem to remediate if appropriate. For example, in certain embodiments the subsystem may cause all communications to be terminated and precluded, or the subsystem may set a nonvolatile indication for the applications subsystem that there was a failure to update due to lack of trust. Such an indication may be read by the applications subsystem when it is in its trusted state, in certain embodiments. Alternately, a communications subsystem may, upon receiving a request to update outside of a trusted state, send a message to a wireless service provider, or other central location to advise of the presence of a potential virus or other malicious code.

Figure 2:
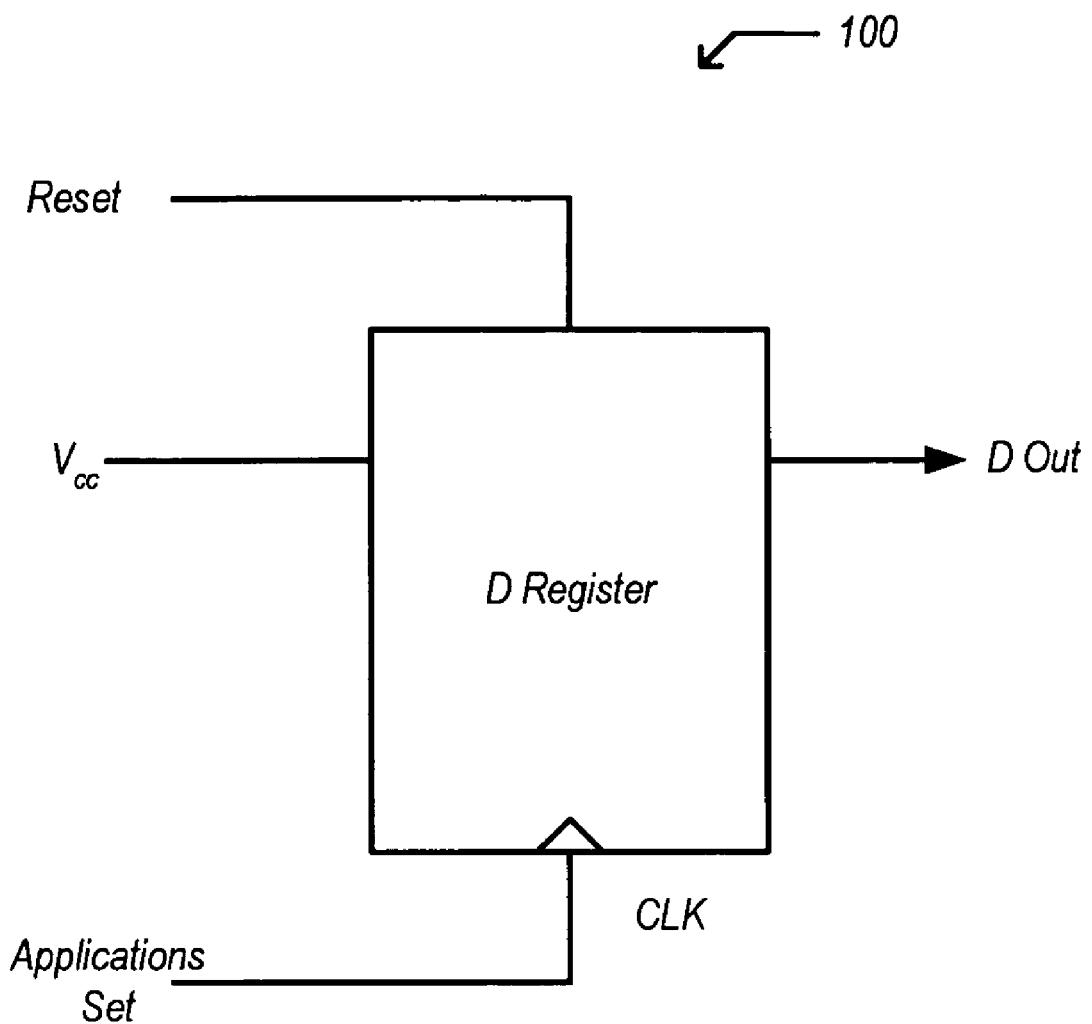
FIG. 2 is a block diagram of a register in accordance with one embodiment of the present invention.

Referring now to FIG. 2, shown is a block diagram of a register in accordance with one embodiment of the present invention. As shown in FIG. 2, register 100 may be a D-type flip-flop register. While shown in the embodiment of FIG. 2 as a flip-flop, it is to be understood that in other embodiments, any register, memory location, or other hardware asset may be used to indicate a trusted state of an applications processor, boot process, and/or a code update.

While such register may be located in various places, in one embodiment, the register may be located such that the applications processor may cause the register to be set, while the communications processor may read the register's contents. In one embodiment, both the applications processor and the communications processor may cause the register to be set. In another embodiment, the register may be located in the communications processor itself.

As shown in FIG. 2, register 100 includes an input ($V_{cc}$) and a clock pulse (CLK) that may be an Applications Set signal received from an applications processor of the wireless device when leaving its trusted state. Also, a reset input may receive a Reset signal that may be received by register 100 upon hard reset of the wireless device, and thus may be used to reset register 100 on power up or other entry into a trusted state. In one embodiment, when the Applications Set signal is input into register 100, a high value may be output on a data output line ($D_{out}$). Such an output signal may be read by the communications processor to learn the state of the applications processor, boot state, and/or code update. While in the embodiment discussed, a programmed (i.e., set) or high signal may be indicative of an untrusted state (e.g., a post-trusted boot state) and a low or reset state indicative of a trusted state (e.g., a trusted boot state), embodiments of the present invention are not so limited.

In various embodiments, register 100 may be a one-way register that once set cannot be reset without resetting the system. That is, register 100 may be writable by the applications processor (changeable) once per hardware-reset period (i.e., one-way). In such manner, if a register value is a low or reset state, a communications processor may reliably determine that the applications processor is in a trusted state (e.g., a trusted boot). In other words, during a booting procedure of the device (i.e., a trusted boot), by definition the register may be reset during the hard reset and may be programmed/set by the applications processor before vectoring out of the boot code.

In such manner, the communications portion may avoid performing a security process, such as a public/private key handshake or other heavy process, thus unifying security processes to run on the applications processor only, and simplifying operations on the communications processor.

Embodiments may be implemented in a program. As such, these embodiments may be stored on a machine-accessible storage medium containing instructions which can be used to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electronically erasable read-only memories (EEPROMs), flash memories, a phase change or ferroelectric memory, a silicon-oxide-nitride-oxide-silicon (SONOS) memory, magnetic or optical cards, or any type of media suitable for storing electronic instructions. Similarly, embodiments may be implemented as software modules executed by a programmable control device, such as a computer processor or a custom designed state machine.

Figure 3:
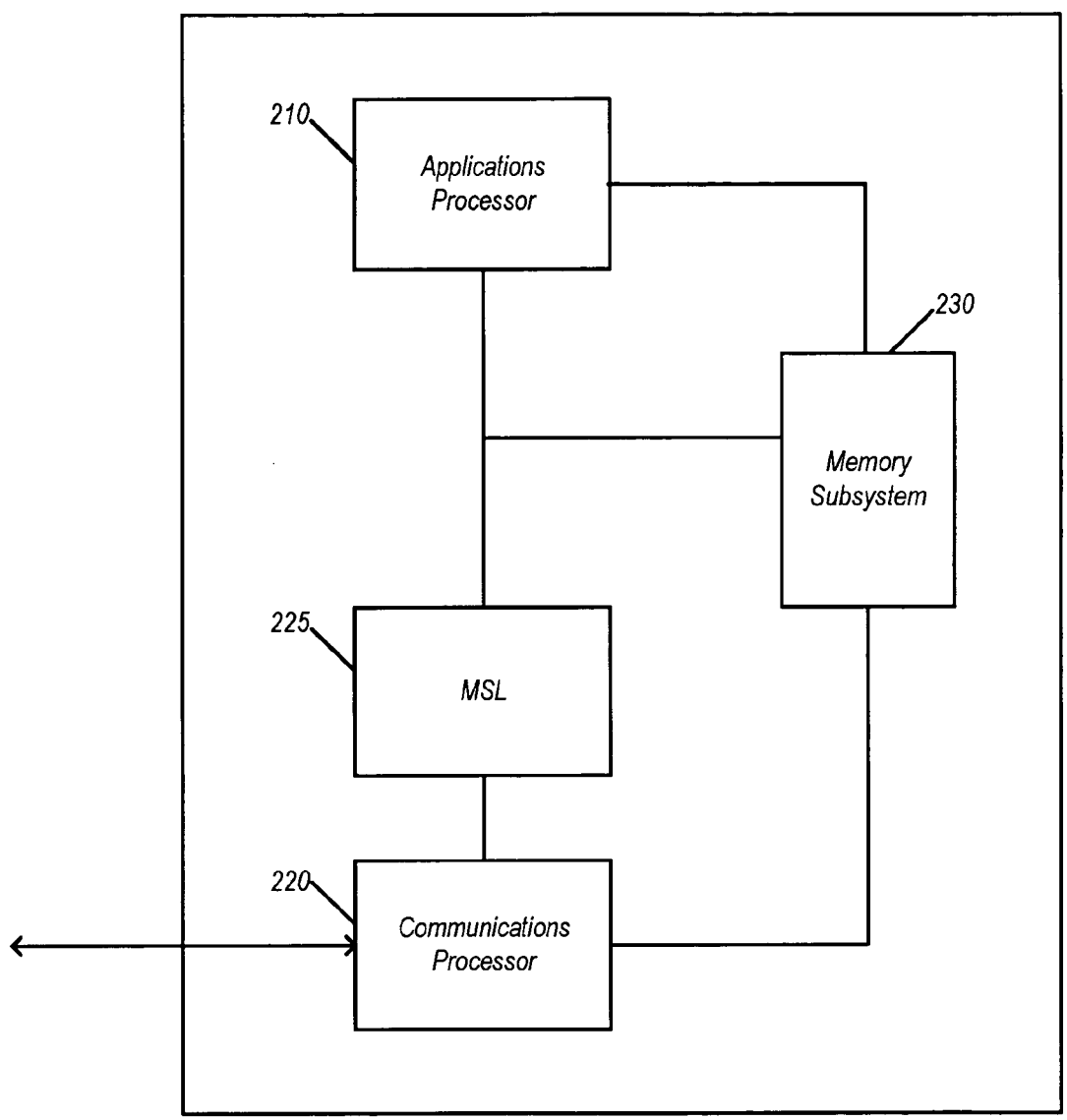
FIG. 3 is a block diagram of a system in accordance with one embodiment of the present invention.

Referring now to FIG. 3, shown is a block diagram of a wireless device with which embodiments of the invention may be used. While discussed in FIG. 3 as a wireless device, it is to be understood that other embodiments may be used with other types of systems, including desktop computers, servers, and the like. As shown in FIG. 3, in one embodiment wireless device 200 includes an applications processor 210, which may include a general-purpose or special-purpose processor such as a microprocessor, microcontroller, application specific integrated circuit (ASIC), a programmable gate array (PGA), and the like. Applications processor 210 may be used to execute various applications such as data processing functions, modification and manipulation of digital content and the like. In one embodiment, applications processor 210 may be a 32-bit processor, such as an XScale™ processor, available from Intel Corporation, Santa Clara, Calif.

Applications processor 210 may be coupled to a communications processor 220, which may be a digital signal processor (DSP) based on a micro signal architecture via an internal bus, which may include a scalable link 225 (such as a mobile scalable link), which may be formed of a plurality of gating devices to scalably transfer data between the processors. A memory subsystem 230 may be coupled to both applications processor 210 and communications processor 220, in certain embodiments. Memory subsystem 230 may include both volatile and non-volatile memory, such as static RAM (SPAM), dynamic RAM (DRAM), flash memories, and the like. While shown in FIG. 3 as separate components, it is to be understood that in other embodiments two or more of the components may be integrated into a single device, such as a single semiconductor device.

It is to be understood that communications processor 220 may include various functionalities including wireless communication with external sources. For example, communications processor 220 may include a wireless interface (which in turn may have an antenna which, in various embodiments, may be a dipole antenna, helical antenna, global system for mobile communication (GSM) or another such antenna). In certain embodiments, the wireless interface may support General Packet Radio Services (GPRS) or another data service. GPRS may be used by wireless devices such as cellular phones of a 2.5G or later configuration.

Other embodiments of the present invention may be implemented in a circuit switched network such as used by 2G technologies, a Personal Communications System (PCS) network, a Universal Wireless Telecommunications System (UMTS), or UMTS Telecommunications Radio Access (UTRA) network or other communication schemes, such as a BLUETOOTH™ protocol or an infrared protocol (such as Infrared Data Association (IrDA)).

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
  receiving, with a first processor, data for use in an operation in a second processor, the first processor being an applications processor including cryptographic and security capabilities that are excluded in the second processor, the second processor being a wireless communications processor;
  verifying, with the first processor, a credibility of the data for the second processor by validating that the data is sent from a trusted source by public and private keys;
  placing the first and second processors in a trusted state;
  exiting the trusted state if the credibility of the data fails; and
  initiating the operation with the second processor while the trusted state has not been exited.

2. The method of claim 1, wherein the operation comprises an information update.

3. The method of claim 2, further comprising:
  setting a register containing a value using the first processor when exiting the trusted state.

4. The method of claim 3, further comprising reading the value using the second processor.

5. The method of claim 3, further comprising preventing an execution of the operation if the value is not indicative of the trusted state.

6. The method of claim 3, further comprising initiating remediation if at least the value is not indicative of the trusted state.

7. The method of claim 2, further comprising receiving the information update via an air interface with the second processor and providing the information update to the first processor.

8. A method comprising:
  maintaining a hardware asset with an applications processor of a system to indicate to another hardware component of the system a trust state of the applications processor, the applications processor including cryptographic and security capabilities that are excluded in the other hardware component, wherein the system comprises a wireless device;
  receiving, with the other hardware component, data for use in an operation in the other hardware component; and
  verifying, with the applications processor, a credibility of the data for the other hardware component by validating that the data is sent from a trusted source by public and private keys.

9. The method of claim 8, further comprising accessing the hardware asset using the other hardware component of the system.

10. The method of claim 9, further comprising updating digital content in the other hardware component if the hardware asset indicates the trust state is valid.

11. The method of claim 9, further comprising preventing updating the other hardware component if the hardware asset does not indicate the trust state is valid.

12. The method of claim 11, further comprising performing a remediation measure using the other hardware component if the trust state is not valid.

13. The method of claim 11, further comprising providing an indication to the applications processor if an update was attempted when the trust state was not valid.

14. The method of claim 8, further comprising
setting the hardware asset via the applications processor when exiting a trusted state, wherein the hardware asset comprises a one-way register.

15. The method of claim 9, further comprising
determining if an update is trusted in the applications processor and transferring the update to the other hardware component if the hardware asset indicates the trust state is valid.

16. An apparatus comprising:
a hardware asset, maintained by an applications processor, to indicate a trust state of an application processor portion of the apparatus to a communications processor, the applications processor including cryptographic and security capabilities that are excluded in the second processor, the communications processor receiving data for use in an operation in the communications processor, the applications processor verifying a credibility of the data for the communications processor by validating that the data is sent from a trusted source by public and private keys.

17. The apparatus of claim 16, wherein the hardware asset is accessible by the communications processor of a wireless device.

18. The apparatus of claim 17, wherein the communications processor cannot modify a value of the hardware asset.

19. The apparatus of claim 16, wherein the hardware asset is coupled to receive a program signal if the trust state of the applications processor portion is not valid.

20. The apparatus of claim 16, wherein the hardware asset is coupled to receive a reset signal to initiate a trusted state.

21. The apparatus of claim 16, wherein the hardware asset comprises a one-way register.

22. A system comprising:
a hardware asset to indicate a trust state of an applications processor portion of the system to a communications processor portion of the system, the applications processor portion including cryptographic and security capabilities that are excluded in the communications processor portion, the communications processor portion receiving data for use in an operation in the communications processor portion, the applications processor portion verifying a credibility of the data for the communications processor portion by validating that the data is sent from a trusted source by public and private keys; and
a wireless interface coupled to the hardware asset.

23. The system of claim 22, wherein the hardware asset is accessible by the communications processor portion of the system, wherein the system comprises a wireless device.

24. The system of claim 22, wherein the hardware asset comprises a one-way register.

25. The system of claim 22, wherein the wireless interface comprises an antenna.

26. An article including a machine-accessible storage medium containing instructions that if executed enable a system to:
control a hardware asset of the system with an applications processor to indicate a trust state of an applications processor portion of the system to another hardware portion of the system, the applications processor portion including cryptographic and security capabilities that are excluded in the other hardware portion, wherein the system comprises a wireless device, the other hardware portion receiving data for use in an operation in the other hardware portion, the applications processor portion verifying a credibility of the data for the other hardware portion by validating that the data is sent from a trusted source by public and private keys.

27. The article of claim 26, further comprising instructions that, if executed, enable the system to update the other hardware portion of the system if the hardware asset indicates the trust state is valid.

28. The article of claim 26, further comprising instructions that if executed enable the system to prevent or discard an update to the other hardware portion of the system if the hardware asset indicates the trust state is not valid.

29. The article of claim 28, further comprising instructions that if executed enable the other hardware portion to initiate a remediation operation if the hardware asset indicates the trust state is not valid.

30. The article of claim 26, further comprising instructions that, if executed, enable the system to perform a secure operation in the other hardware portion of the system if the hardware asset indicates the trust state is valid.

31. The article of claim 26, further comprising instructions that, if executed, enable the applications processor portion to vector into a trusted state before initiating a transfer operation to the other hardware portion of the system.

32. A method comprising:
receiving, with a communications processor portion of a system, data for use in an operation in the communications processor portion;
verifying, with an applications processor portion of the system, the applications processor portion including cryptographic and security capabilities that are excluded in the communications processor portion, a credibility of the data for the communications processor portion by validating that the data is sent from a trusted source by public and private keys;
setting a value to indicate a trust state of the applications processor portion;
accessing the value with the communications processor portion; and
determining the trust state of the applications processor portion based on the value.

33. The method of claim 32, further comprising initiating an operation in the communications processor portion if the value is indicative of the trust state.

34. The method of claim 33, wherein the operation comprises an information update.

35. The method of claim 32, wherein the applications processor portion comprises an applications portion of a wireless device and the communications processor portion comprises a communications portion of the wireless device.

* * * * *